(No Model.) 4 Sheets—Sheet 1.

G. W. McCLURE.
HOT BLAST STOVE.

No. 469,826. Patented Mar. 1, 1892.

Witnesses
C. M. Clarke
H. L. Gill

Inventor
George W. McClure
by W. Bakewell & Son
his Attorneys (No Model.) G. W. McCLURE. 4 Sheets—Sheet 2.
HOT BLAST STOVE.

No. 469,826. Patented Mar. 1, 1892.

(No Model.) 4 Sheets—Sheet 3.

G. W. McCLURE.
HOT BLAST STOVE.

No. 469,826. Patented Mar. 1, 1892.

WITNESSES
INVENTOR
George W. McClure
by W. Bakewell & Sons
his Attorneys (No Model.) 4 Sheets—Sheet 4.
G. W. McCLURE.
HOT BLAST STOVE.

No. 469,826. Patented Mar. 1, 1892.

Witnesses
C. L. Jackson
H. M. Corwin

Inventor
George W. McClure
by W. Bakewell Sons
his Attorneys

UNITED STATES PATENT OFFICE.

GEORGE W. McCLURE, OF PITTSBURG, PENNSYLVANIA, ASSIGNOR OF ONE-HALF TO CARL AMSLER, OF SAME PLACE.

HOT-BLAST STOVE.

SPECIFICATION forming part of Letters Patent No. 469,826, dated March 1, 1892.

Application filed July 17, 1890. Serial No. 359,029. (No model.)

*To all whom it may concern:*

Be it known that I, GEORGE W. MCCLURE, of Pittsburg, in the county of Allegheny and State of Pennsylvania, have invented a new and useful Improvement in Hot-Blast Stoves, of which the following is a full, clear, and exact description, reference being had to the accompanying drawings, forming part of this specification, in which—

Figure 1:
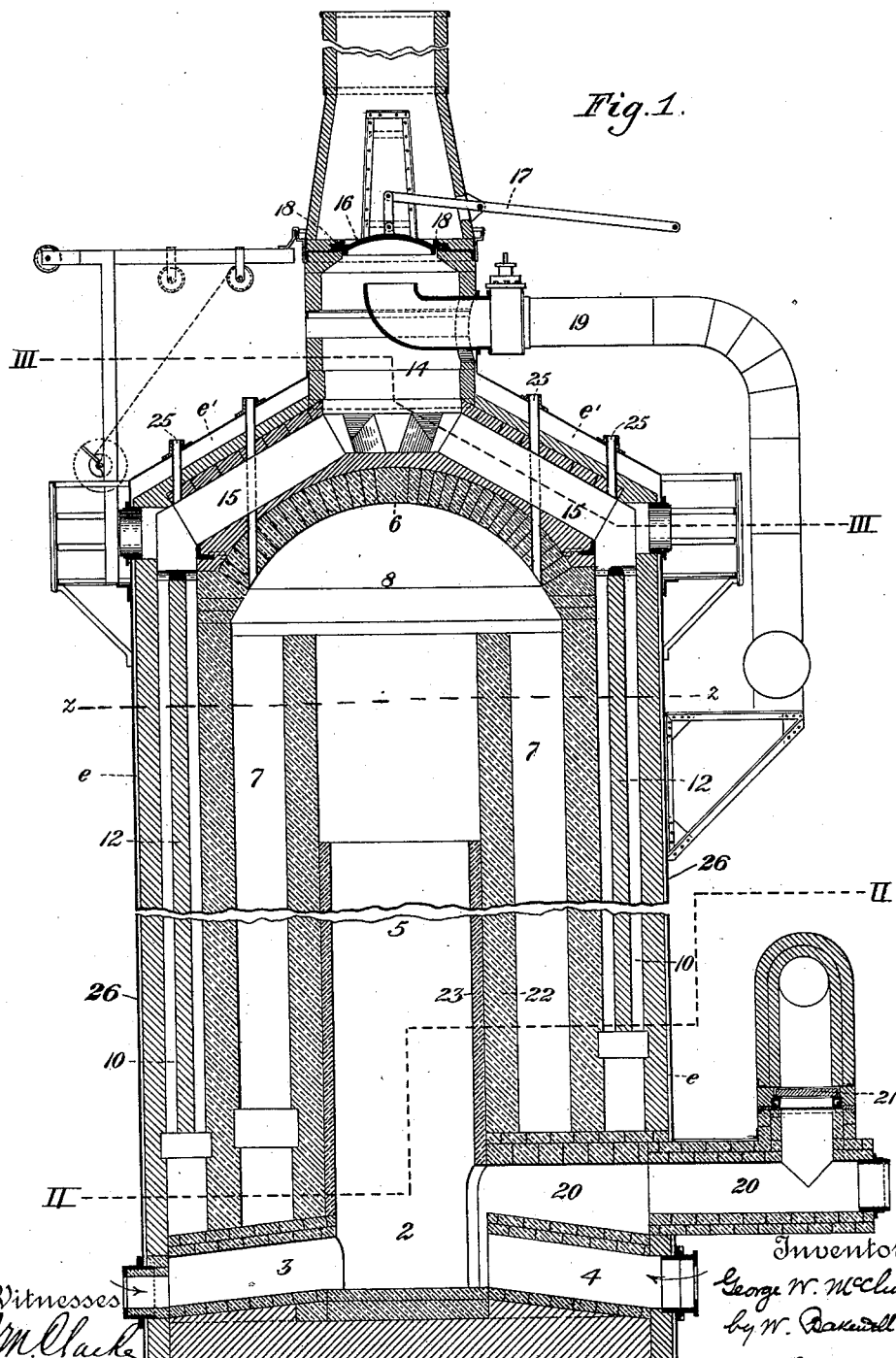
Figure 2:
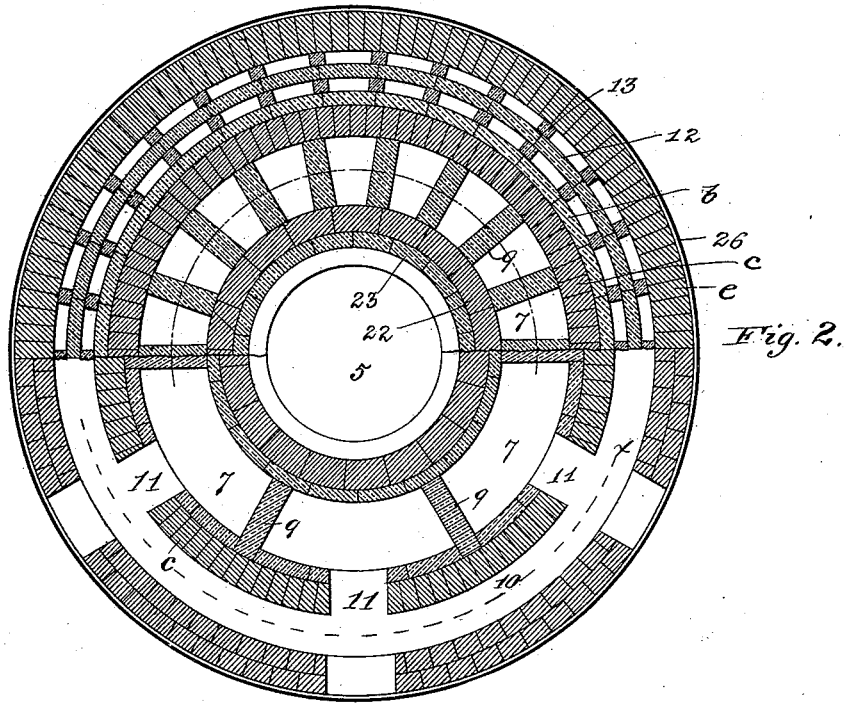
Figure 2A:
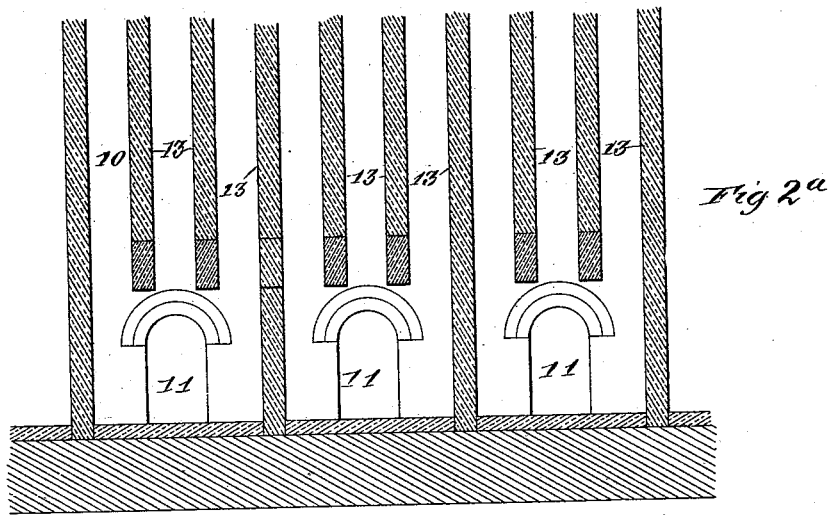
Figure 3:
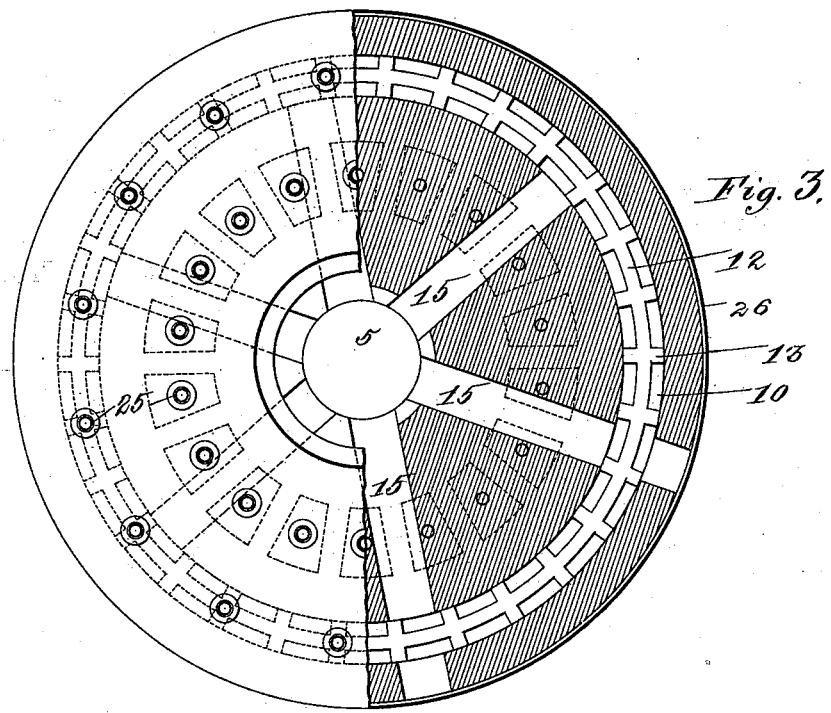
Figure 3A:
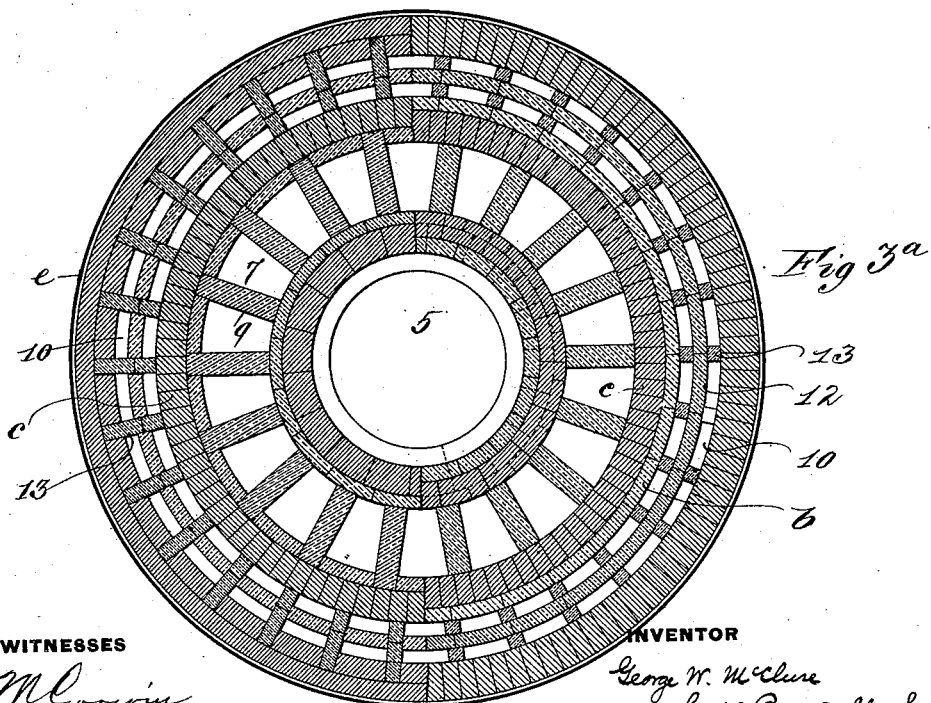
Figure 4:
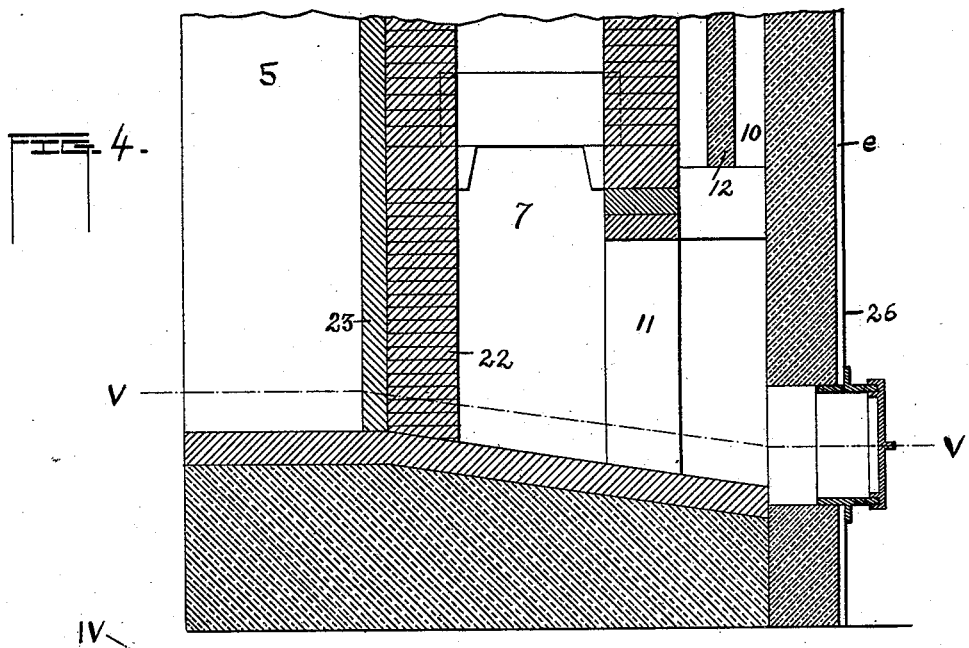
Figure 5:
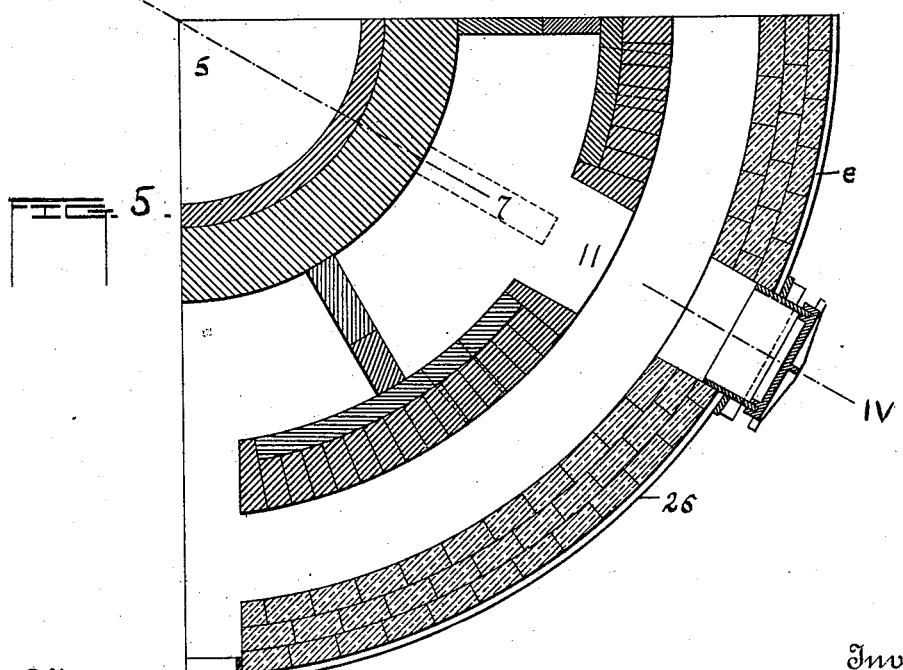

Figure 1 is a vertical central sectional view of my improved hot-blast stove. Fig. 2 is a view showing the same in horizontal section on the line II II of Fig. 1. Fig. 2$^a$ is a section taken in the plane of line $x\ x$ of Fig. 2. Fig. 3 is a view one half of which shows in plan view the top of the stove, while the other half shows it in transverse section on the line III III of Fig. 1. Fig. 3$^a$ is a section taken in the plane of line $z\ z$, Fig. 1. Fig. 4 is an enlarged vertical section of one side of the stove, taken through one of the bottom doors on the line IV IV of Fig. 5. Fig. 5 is a horizontal cross-section on the line V V of Fig. 4.

Like symbols of reference indicate like parts in each.

My stove resembles in some respects the stove shown in Patent No. 398,840, dated March 5, 1889, and granted on an application filed by Horace Massicks and Walter Crooke, but is in many respects an improvement thereon.

As shown in the drawings, the stove has a central combustion-chamber, a central vertical flue which forms the first pass for the gas by which the stove is heated, and vertical flues arranged outside the central flue, through which the gas passes in its course through the stove.

2 is the combustion-chamber.

3 is the transverse flue through which gas is admitted to the combustion-chamber.

4 is a flue through which air is admitted to burn with the gas, and 5 is the vertical flue forming the first pass for the burning gas. This flue is preferably circular in cross-section and extends nearly to the crown or arch 6.

7 7 are vertical flues communicating at the top with the space 8 under the crown and extending downwardly exterior to the walls of the flue 5. The conjoined flues 7 form an annular space within the stove, which is separated into individual flues by radial walls 9, extending to the bottom of the stove. Outside the flues 7 is an annular series of flues 10, which communicate at the base with the flues 7 through ports 11, and which may be divided into two annular divisions by an upright circular wall 12, which extends to within a short distance of the bottom of the flues. The transverse divisions of the flues 10 are formed by radial walls 13. Some of the walls 9 extend entirely to the bottom of the stove, thus dividing the flues 7 into parts laterally distinct from each other, which so guide the gas in its flow as to prevent it from passing through some of the parts of the stove in preference to others. At their upper ends the flues 10 are connected with the stack-flue 14 by transverse flues 15, which extend through the crown of the stove and are shown in Figs. 1 and 3.

16 is the chimney-valve, consisting of a disk supported by a suitable lever 17 and adapted to fit against the under side of a seat 18, built in the masonry of the stack.

19 is the cold-blast pipe, which enters the stack, and at its end is upwardly directed toward the under side of the valve 16, so that the pressure of the blast emerging from the pipe tends to force said valve to its seat.

20 is a hot-blast outlet-flue, which leads from the combustion-chamber at the base of the flue 5 and is provided with a suitable valve 21.

The manner of building the walls of the stove is novel and is illustrated in Fig. 2. The walls of the flue 5 are built of vertical brick courses 22 and 23, and at the lower part it may have an interior lining 24. The use of the two vertical courses of bricks 22 and 23 is desirable, in order that each may cover the vertical joints of the other, and in building the stove I prefer to secure greater stability by setting the bricks 22 on the inside and on the outside in alternate horizontal courses. This is illustrated in Fig. 3$^a$, in which I show a horizontal section of the stove, taken on two distinct section-planes, each half of the view being taken on a horizontal plane intersecting the next horizontal course of bricks above or below the plane of the other. As shown in this view and in part of Fig. 2, the outer circular wall of the flue 7 is constituted of vertical courses of wide and narrower bricks $b$ and $c$ which in alternate horizontal courses are set on alternate sides of the wall. The radial walls 9 are built of bricks, which in alternate horizontal courses are tied to the outer wall of the flue 7, as shown at the left of Fig. 3ᵃ, and in the intermediate courses are preferably not so tied thereto, but simply abut against the said wall, covering some of the vertical joints thereof. The bricks of the walls 9, however, are not tied to the inner wall of the flue 7, but simply abut against the said wall, covering some of the vertical joints thereof. In like manner the bricks of the radial walls 13 are tied in alternate horizontal courses to the outer wall of the flue 10, but simply abut against the inner wall of said flue. The stove is incased on the outside in the usual strong metal jacket 26. When thus constructed, the walls of the stove may expand and contract vertically without danger of breaking the other walls, as in stoves in which the flue-walls are fixedly bonded together. Thus when the central flue-wall, being the one most subject to heat, expands vertically it does so independently of the outer circular wall and flue-walls 9, which being bonded together and both subject to about the same heat are not bonded to the inner wall. In like manner the outer circular wall of the flue 7 and the radial walls 9 expand and contract quite independently of the outer wall of the stove and walls 13, which, though bonded together, are not fixed to the inner circular wall against which they abut. The stove on the outside is incased in the usual strong metal jacket 26. This structure is one which is extremely durable and is of great advantage in preserving the stove by resisting the force exerted upon the walls by the expansion caused by the heat of the burning gases. To a great measure the bricks of each flue are braced by the breaking of its vertical joints by the bricks of the inner and outer flues and by the bricks of the radial walls, so that each flue-wall takes up the force exerted on its neighboring walls, thus obliging all to expand and contract laterally as a unit. The difficulties arising from independent lateral expansion and contraction of the flue-walls, which have been such as to cause these walls soon to deteriorate or to collapse, are thus altogether avoided.

In order to prevent expansion of the stove from injuring the jacket, I leave a small annular space e between the inside of the jacket and the outer surface of the brick structure of the stove and a still larger space e' between the crown of the stove and the under side of the top of the jacket. These spaces permit the brick-work to expand freely within the desired limits.

In order to provide means for cleaning the flues, I use vertical pipes 25, extending into the flues from the top of the stove, as shown in Figs. 1 and 3. Suitable brushes or scrapers may be operated by chains introduced into the flue through these pipes. When not in use, the pipes are closed by suitable caps. (Not shown.)

I shall now describe in general the operation of my improved stove. To heat the flues preparatory to forcing the blast therethrough, the combustible gas is admitted at 3 into the combustion-chamber, where it combines with air entering the port 4, and in a state of combustion passes up through the flue 5 to the chamber 8, thence in its second pass down through the flues 7, and finally up through the flues 10 and 15 to the stack-flue. The construction of my stove is so perfect that the heat of the gas is absorbed by the flue-walls and is reduced to a minimum by the time it reaches the stack. When the stove has been sufficiently heated, the valves of the ports 3 and 4 and the stack-valve 16 are closed, the valve 21 is opened, and the air-blast is admitted to the stove from the pipe 19 and passes through the flues in a reverse order to that just indicated, and finally emerges in a superheated state through the flue 20.

I claim—

1. In a hot-blast stove, the combination, with an upwardly-seating stack-valve and means for positively actuating it, of an air-blast pipe having its end directed toward the under side of the valve and adapted to apply to the valve a seating-pressure, substantially as and for the purposes described.

2. In a hot-blast stove, a vertical central combustion-flue having an annular wall, a surrounding annular wall separated therefrom to afford an intermediate flue-space connected at the top with the combustion-flue, subdividing radial walls interposed between the wall of the combustion-flue and the outer wall and being keyed to one of said walls and abutting against the other, so as to be capable of motion with its attached wall independently of the other, air and gas inlets for the combustion-flue, a hot-blast outlet leading from the stove, a cold-blast inlet, and a stack-flue, substantially as and for the purposes described.

3. In a hot-blast stove, a vertical central combustion-flue having an annular wall, a surrounding annular wall separated therefrom to afford an intermediate flue-space connected at the top with the combustion-flue, subdividing radial walls interposed between the wall of the combustion-flue and the outer wall and being keyed to one of said walls and abutting against the other, so as to be capable of motion with its attached wall independently of the other, a third and outer annular wall concentric with the others, and subdividing radial walls interposed between the last-named annular wall and the next inner annular wall, keyed to one of said walls and abutting against the other, substantially as and for the purposes described.

In testimony whereof I have hereunto set my hand this 12th day of July, A. D. 1890.

GEORGE W. McCLURE.

Witnesses:
W. B. CORWIN,
W. BAKEWELL.